3,081,221
Patented Mar. 12, 1963

3,081,221
PHENOLIC ANTIMICROBIAL COMPOSITIONS CONTAINING A POLYAMINE-SALICYLAL-DEHYDE CONDENSATION PRODUCT
Clarence L. Moyle, Clare, and Robert L. Johnson, Midland, Mich., assignors to The Dow Chemical Company, Midland, Mich., a corporation of Delaware
No Drawing. Filed Feb. 25, 1959, Ser. No. 795,365
2 Claims. (Cl. 167—31)

This invention relates to new and improved compositions for use in coating compositions, oil and latex paint compositions and cellulosic materials to provide degradation resistant properties.

The control of microorganisms is a persisting problem. The wide variety of organisms and the varying conditions and situations where control is necessary present particular problems which preclude a simple solution. Preservative needs are found in the textile, paper, food, wood, coatings and paint fields. For example, it is known that coating compositions are subject to bacterial and fungal attack. Many preservatives have been employed but have been found to undergo diminution in activity or reduction in killing power upon storage or standing on the shelf. This is of particular importance in paint compositions which may be subject to frequent repeated contamination by opening of containers, insertion of brushes, exposure to dust and other sources. High concentration of preservative affects the brushing and spreading characteristics of the paint compositions or otherwise confers undesirable properties to the films formed therefrom.

Films formed from coating compositions are subject to mildew collection, that is, a phenomenon of the coating or film manifest by the presence of mold or fungus growth. Such attack results in eventual failure of paint or varnish film brought about by consumption of oil components or change in chemical composition of paint constituents by the microorganisms, pH change due to metabolic by-product formation, or discoloration by accumulation of mycelia and spores thereon. Furthermore, such growth frequently works under the film through abrasions and cracks producing deterioration of the structures underneath. Many fungicidal agents which have been suggested for inclusion in oil paints and films react with oils and pigments causing discoloration or fading thereof. Others act as antioxidants and antisiccatives thereby slowing the drying rate. The protective effects produced by certain fungicidal agents are transitory since they vaporize or are otherwise dissipated out of the composition upon weathering. Certain others are decomposed by light and air.

Wood and wood products such as lumber employed in frame building constructions, poles or posts are subject to fungal attack manifest by surface growth which is followed by deterioration and loss of the wood. Many preservatives currently employed are subject to loss or inactivation on standing for long periods, particularly on exposure to high humidity or persistently damp conditions. Certain preservatives are undesirable because they bleed or crystallize (bloom) on the surfaces. Other cellulosic materials such as paper and textiles are also susceptible to microbially induced degradation. Where conditions of high humidity and temperature accelerate microbial growth, obnoxious and musty odors are frequently found to be produced.

Halophenols are widely used as preservatives because of their broad antimicrobial activity and relatively desirable properties such as low toxicity to higher animals, mild corrosiveness, relatively pleasant odor and lack of color, properties which are present to a high degree in other preservatives such as organic mercury compounds and organo sulfur compounds. However, the preservative activity is frequently inadequate, microbial growth and/or deterioration setting in, particularly if subject to weathering conditions or to standing over extended periods. Frequently a relatively large amount of preservative agent will provide adequate protective action but this preservative effectiveness is generally accompanied by impartation of undesirable properties to the material or system being treated. Furthermore, in most instances it is difficult if not impossible to reapply a preservative composition. These and similar problems have not been solved by the alternative of employing salts or halophenols. Thus, the alkali metal salts or their lower amine salts are found to have similar limitations as the halophenols themselves, frequently requiring high concentration to obtain preservation and further have an additional limitation of increased solubility in water, rendering them useless in applications where exposure to high humidity or water may be encountered. Other salts such as lead and copper salts have limitations such as extremely low solubility rendering compounding difficult or high color as in the case of copper salts or ready reactivity with hydrogen sulfide as in the case of lead salts. Thus, it is clear that there exists a need for an antimicrobial agent that is effective at low concentration and is resistant to diminution of its antimicrobial action.

It has been discovered that a new, active antimicrobial composition may be constituted by the combination of (1) a halophenol compound and (2) a condensation product of an aliphatic polyamine with salicylaldehyde. This composition when employed for antimicrobial uses prevents the growth of microorganisms at a concentration considerably less than that required when employing either component alone. This combination of reagents is particularly valuable from the standpoint of decreasing substantially the amount of halophenol or salt thereof necessary in many compositions. The incorporation of the polyamine-salicylaldehyde condensation product in an amount of as little as 1/15 part by weight for each part by weight of halophenol provides an improved composition which affords a protective action otherwise obtained only by using two to three times as much of the halophenol compound when employed alone. This antimicrobial activity is of more lasting duration under more rigorous conditions than that obtained by use of either component alone even when the components are employed in larger amounts. Thus, the present composition gives substantially complete protection when subjected to rigorous conditions of humidity and temperature under which conditions no protection was afforded by either halophenol compound or condensation product when employed alone. Furthermore, the new composition confers substantially no undesirable properties to the system to be treated.

By the expression "halophenol compound" as herein employed is meant halophenols as hereinafter defined and water-soluble salts thereof. The halophenols suitable for the practice of this invention are halogenated monohydric phenols and embrace halogenated parasiticidal phenols including alkyl and phenyl substituted phenols which have been chlorinated or brominated. Halophenols of particular value in the practice of this invention are those defined by the structure

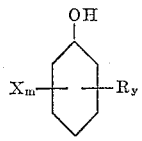

wherein R is a substituent selected from the group consisting of methyl and phenyl, each X is at least one of bromine and chlorine, $y$ is 0 or 1, and $m$ is an integer of from 1 to 5 (5—$y$), inclusive. Suitable halophenols are those having mixed chlorine and bromine as well as those having a single halogen species and include 2-bromo-4-chlorophenol, 2-bromo-4,6-dichlorophenol, 2,6-dibromo-4-chlorophenol, 2-chloro-4-phenylphenol, 2,3,4-trichlorophenol, 2,3,6-trichlorophenol, 2,4,5-trichlorophenol, 4-bromophenol, 2-bromophenol, 2,4-dibromophenol, 4-chloro-m-cresol, 2-chloro-4,6-dibromophenol, pentachlorophenol, pentabromophenol, 2,3,5,6-tetrachlorophenol, 2,3,4,5-tetrachlorophenol, 2,3,4,6-tetrachlorophenol, 2,3,5,6-tetrachloro-p-cresol, 2,4,5,6-tetrabromo-m-cresol, 2,4,6-trichlorophenol, 3,4-dichlorophenol, 2,3-dichlorophenol, 2,5-dichlorophenol, 2,6-dichlorophenol, 2,4-dichlorophenol, 2,3,6-tribromo-p-cresol, 2,4,6-trichloro-m-cresol, 2,4,6-tribromo-m-cresol, 4-chlorophenol, 3-chlorophenol, 2-chlorophenol, 4,6-dibromo-o-cresol, 2,5-dibromo-p-cresol, 3,6-dibromo-2-chloro-p-cresol, 2-bromo-4-phenylphenol, 4-bromo-2-phenylphenol and 4-chloro-2-phenylphenol.

When the compositions of the present invention are employed in aqueous systems or can be applied employing aqueous treating compositions, water-soluble salts of the halophenols may be employed instead of the parent halophenol. Particularly suitable are the alkali metal, ammonium and amine salts such as potassium, sodium, lithium, ethylamine, methylamine, ethanolamine, trimethylamine, propylamine, isopropanolamine, triethanolamine, etc.

The polyamine-salicylaldehyde condensation product employed in the practice of this invention is a product obtainable by the reaction of from 1.5 to 3.5 moles of salicylaldehyde with one mole of an aliphatic polyamine having a molecular weight of at least 100, at least 3 amino groups in its molecular structure and corresponding to the general formula $$H_2N(C_nH_{2n}NH)_xH$$

wherein $n$ is an integer of from 2 to 3, inclusive, and $x$ is an integer from 2 to 4, inclusive. Suitable condensation products may be employed from the reaction of an amine such as diethylenetriamine, triethylenetetramine, tetraethylenepentaamine, dipropylenetriamine, tripropylenetetramine and tetrapropylenepentaamine or a mixture thereof with salicylaldehyde.

The polyamine-salicylaldehyde condensation product may be prepared by intimately mixing the appropriate aliphatic polyamine and salicylaldehyde. A reaction occurs with some evolution of heat and the formation of the desired condensation product and water of reaction. The reaction is preferably carried out in the absence of solvent by vigorously agitating the components until a homogeneous mixture is obtained. Heating may be employed in carrying out the reaction. The preferred temperature range is from 60° to 100° C. A non-reacting polar solvent may be employed as a reaction medium. Lower alcohols are particularly suitable. The polyamine condensation product resulting from the reaction is a clear, viscous, yellow colored composition which may be somewhat gelatinous. It is miscible with polar solvents such as alcohols, glycols, glycol ethers, acetone, etc. The water or solvent may be removed at reduced pressure while maintaining the temperature below about 100° C. to obtain the product as an anhydrous solid.

For the successful practice of this invention, it is desirable that the polyamine-salicylaldehyde condensation product prepared as above described be present in an amount of at least 1/12 by weight of the amount of halophenol employed although in many instances an amount of 1/15 by weight is satisfactory. The lower limit is based on the weight of the halophenol equivalent of the water-soluble salt when the latter is employed. The upper limit is not critical and is usually dictated by economic considerations or factors to be considered with respect to the particular system where employed. The optimum amount of the condensation product with respect to the halophenol may also vary with the particular system in which the composition of the present invention is employed as well as with the amount of halophenol employed. For example, in an oil paint composition, the best results are obtained when the composition is employed in the ratio of halophenol to condensation product of about 6:1 to 12:1 and with a halophenol concentration in the paint composition of about 0.75 to about 1.5 percent by weight.

The new composition comprising (1) a halophenol compound and (2) a condensation product of an aliphatic polyamine with salicylaldehyde as previously defined is prepared by simply mixing the components. The composition is preferably employed in a solvent. Solvents particularly useful are polar solvents or mixtures of solvents in which one component is polar such as glycol ethers, alcohols, ketones or a mixture such as hydrocarbon-ketone-alcohol mixture or ether-alcohol mixture. The compositions may be applied by any method normally employed in the use of halophenols or salts thereof as antimicrobial agents. Thus, the material to be treated may be impregnated by dipping or immersion with or without pressure as in the case of wood and wood products or may be mixed in a composition as in the case of paint and other coating compositions or may be added in a step in its manufacture, or sprayed or brushed onto the final product. The mere application or incorporation of the composition of the present invention is sufficient to impart the desirable properties and the effectiveness thereof does not require special after treatment procedures such as baking.

One of the many antimicrobial applications in which the composition of the present invention has found particular usefulness is in preventing microbial growth and microbially induced degradation in films formed 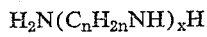 from both oil and water base paints. Coatings and films formed from currently marketed oil and alkyd resin paint compositions which contain germicidal agents suffer from mildew growth after exposure to normal conditions of temperature and humidity, and if employed on wood surfaces the applications are followed by microbially induced degradation of the wood itself. However, compositions of the present invention, when incorporated into an oil paint and the resulting modified oil paint employed to paint soft wood panels, are found to give excellent control against mildew formation of the panels when the latter are exposed to very rigorous conditions of temperature and humidity. Furthermore, such control is effective for an extended period. In addition, the present compositions are useful for increasing the shelf life of coating compositions. Coating materials containing compositions of the present invention have been found to adequately prevent microbial growth.

Another application of the present invention is in the preservation of wood against fungus induced decay.

Thus, wood impregnated with compositions of the present invention and exposed to wood inhabiting fungi in growth promoting atmosphere, after a period of time shows little or no loss in weight from decay.

Other applications include preservation of paper and other cellulosic materials. For example, paper treated with compositions of the present invention when subjected to rigorous temperature-humidity conditions show resistance to microbial attack. Furthermore, treated material, maintained for an extended period of time and subsequently subjected to rigorous temperature-humidity conditions show similar effective resistance to microbial attack.

In all such applications the degree of protection control provided by compositions of the present invention was greater than that provided by either compound alone even when employed at higher concentrations.

The following examples illustrate the invention but are not to be construed as limiting.

EXAMPLE 1

An oil paint having the composition set forth below was made by intimately blending in a conventional manner oil, varnish and pigments and adding to the resulting paste, driers, solvents and water.

|  | Lbs. |
|---|---|
| Iron oxide pigment | 1,498 |
| Amorphous silica | 888 |
| Asbestine | 1,476 |
| Spar varnish (60 percent N.V.) | 1,180 |
| Linseed oil, Q bodied | 2,888 |
| Mineral spirits | 626 |
| Water | 88 |
| Co drier (6 percent) | 28 |
| Pb drier (24 percent) | 70 |
| Mn drier (6 percent) | 11 |
|  | 8,153 |

Compositions comprising (1) halophenol and (2) polyamine-salicylaldehyde condensation product were prepared as follows:

| Composition A— | Weight percent |
|---|---|
| 2,3,4,6-tetrachlorophenol | 24 |
| Diethylenetriamine-salicylaldehyde (1:2) [1] | 4 |
| Turpentine | 72 |
| Composition B— | |
| 2,3,4,6-tetrachlorophenol | 30 |
| Diethylenetriamine-salicylaldehyde (1:2.5) [1] | 5 |
| Water | 0.6 |
| Propyleneglycol monomethyl ether | 64.4 |
| Composition C— | |
| 2,3,4,6-tetrachlorophenol | 30 |
| 3,3'-diaminodipropylamine-salicylaldehyde (1:2) [1] | 5 |
| Water | 0.6 |
| Propyleneglycol monomethyl ether | 64.4 |

[1] Figures in parentheses above and in subsequent examples represent moles of polyamine and salicylaldehyde, respectively, employed in the preparation of the condensation product.

The ratio of the halophenol to the condensation product in the above compositions is 6:1. These compositions were added to and intimately admixed with an oil paint composition above described to produce modified paint compositions containing the halophenol in a concentration of 1 percent by weight.

The modified paint compositions were then applied to panels of ponderosa pine. The painted panels were allowed to dry by standing for 2 to 3 days at room temperature. A second coat was then applied and the panels allowed to dry by standing for 5 days at room temperature. After drying, the panels were placed in a tropical chamber maintained at 88° F. and 95 percent relative humidity. After four weeks, the panels were visually evaluated for the amount of mildew growth and compared with check panels painted with unmodified paint. The check panels showed very heavy mildew growth wherein the surface of the panel was completely covered. The results obtained are shown in Table I.

Table I

| Composition: | Control of mildew growth |
|---|---|
| A | Excellent. |
| B | Good. |
| C | Excellent. |
| Check | None. |

EXAMPLE 2

In a similar operation, the effect of varying the amount of a condensation product while maintaining the amount of halophenol constant was determined and compared with the effect of incorporating a smaller or larger amount of one of the components. Compositions consisting of 30 percent by weight of 2,3,4,6-tetrachlorophenol and varying ratios of triethylenetetramine-salicylaldehyde (1:2) condensation product were prepared in propylene glycol monomethyl ether. The compositions were separately incorporated in the oil paint above described at levels to provide a concentration of 2,3,4,6-tetrachlorophenol of 1 percent in the paint. In other operations, oil paint having the composition described in Example 1 was modified by the addition of one component. Thus, a treating composition of 30 percent 2,3,4,6-tetrachlorophenol in propylene glycol monomethyl ether was added to paint at a level of 1 percent and 3 percent. Another treating composition of 30 percent triethylene-tetramine-salicylaldehyde (1:2) condensation product in propylene glycol monomethyl ether was added to paint at a level of 1 percent. Panels were painted, dried and placed in a tropical chamber for three weeks and examined visually for the amount of mildew growth. The results are given in Table II.

Table II

| Percent 2,3,4,6-tetrachlorophenol in paint composition | Percent triethylene-tetramine-salicylaldehyde condensation product in paint composition | Ratio of halophenol to condensation product | Amount of mildew growth |
|---|---|---|---|
| 1.0 | 0.25 | 4:1 | None. |
| 1.0 | 0.167 | 6:1 | Do. |
| 1.0 | 0.067 | 15:1 | Slight. |
| 1.0 | None | | Heavy. |
| 3.0 | None | | Moderate. |
| None | 1.0 | | Heavy. |
| None | None | | Very heavy. |

EXAMPLE 3

In similar operations, various compositions comprising (1) halophenol and (2) polyamine-salicylaldehyde condensation product were prepared in propylene glycol monomethyl ether. These compositions were similar to those described in Examples 1 and 2 and contained 30 percent by weight of the halophenol. The compositions were incorporated into paint having the composition described in Example 1, wood panels painted therewith and dried as described in Example 1. Other panels were painted with paint having the composition described in Example 1 but modified with 1 percent by weight of halophenol or 1 percent by weight of polyamine-salicylaldehyde condensation product. Still other control panels were painted with unmodified paint. The panels were exposed to the conditions of the tropical chamber for 3 weeks. The panels were then examined visually for mildew growth and compared with control panels painted with unmodified paint. The results are given in Table III.

Table III

| Halophenol | Percent by weight | Condensation product (polyamine-aldehyde) | Percent by weight | Ratio halophenol/condensation product | Control of mildew growth |
|---|---|---|---|---|---|
| 2,3,4,6-tetrachlorophenol | 1 | Triethylenetetramine-salicylaldehyde (1:2) | 0.1 | 10:1 | Excellent. |
| 2,4,5-trichlorophenol | 1 | ___do___ | 0.167 | 6:1 | Do. |
| Pentachlorophenol | 1 | ___do___ | 0.1 | 10:1 | Do. |
| 2-chloro-4-phenylphenol | 1 | ___do___ | 0.25 | 4:1 | Do. |
| Tetrachlorocresol [1] | 1 | ___do___ | 0.1 | 10:1 | Do. |
| | | ___do___ | 1.0 | | None. |
| 2,3,4,6-tetrachlorophenol | 1 | Tetraethylenepentaamine-salicylaldehyde (1:2) | 0.25 | 4:1 | Excellent. |
| Do | 1 | ___do___ | 0.167 | 6:1 | Do. |
| Do | 1 | ___do___ | 0.1 | 10:1 | Do. |
| Pentachlorophenol | 1 | ___do___ | 0.25 | 4:1 | Do. |
| 2,4,5-trichlorophenol | 1 | ___do___ | 0.1 | 10:1 | Good. |
| 2-chloro-4-phenylphenol | 1 | ___do___ | 0.167 | 6:1 | Excellent. |
| 4-bromophenol | 1 | ___do___ | 0.167 | 6:1 | Do. |
| 2,3,4,6-tetrachlorophenol | 1 | | 0.0 | | None. |
| Pentachlorophenol | 1 | | 0.0 | | Do. |
| 2-chloro-4-phenylphenol | 1 | | 0.0 | | Do. |
| 2,4,5-trichlorophenol | 1 | | 0.0 | | Do. |
| 4-bromophenol | 1 | | 0.0 | | Do. |
| Check | 0 | | 0.0 | | Do. |

[1] 59 percent tetrachloro-m-cresol, 22 percent tetrachloro-p-cresol, 15 percent tetrachloro-o-cresol.

EXAMPLE 4

In a manner similar to that described in Example 1, compositions comprising (1) halophenol and (2) polyamine-salicylaldehyde condensation product are prepared in propylene glycol monomethyl ether at a concentration of 15 percent by weight of halophenol as follows:

| Halophenol | Condensation product | Ratio halophenol condensation product |
|---|---|---|
| 2-chloro-4,6-dibromophenol | Dipropylenetriamine - salicylaldehyde (1:2) | 10:1 |
| 2,3,4,5-tetrabromophenol | Diethylenetriamine - salicylaldehyde (1:2) | 12:1 |
| 2,4,6-tribromo-m-cresol | Tripropylenetetramine - salicylaldehyde (1:2.5) | 6:1 |
| 2,4,6-trichloro-m-cresol | Triethylenetetramine - salicylaldehyde (1:2.8) | 4:1 |
| 2,3,5,6-tetrachloro-p-cresol | Tetraethylenepentamine - salicylaldehyde (1:2) | 8:1 |
| 3,4-dichlorophenol | Tetraethylenepentamine-salicylaldehyde (1:3.5) | 4:1 |
| 2,4,6-tribromophenol | Triethylenetetramine - salicylaldehyde (1:2.5) | 2:1 |

The above compositions are incorporated into commercial oil paint compositions at a level sufficient to provide modified paint compositions containing 1.5 percent by weight of the halophenol component. Wood panels are painted with the modified paint compositions as well as with unmodified paint and exposed in a tropical chamber for two weeks. The panels are then visually examined as previously described. Panels painted with modified paint compositions show substantially no mildew formation whereas panels painted with unmodified paint show heavy mildew growth.

EXAMPLE 5

A treating composition having the following composition is prepared:

| | Weight percent |
|---|---|
| 2,3,4,6-tetrachlorophenol | 30 |
| Dipropylenetriamine-salicylaldehyde (1:2.5) | 3 |
| Propylene glycol monomethyl ether | 67 |

The above composition is intimately admixed with an oil paint having the composition set forth in Example 1 to provide modified oil paint compositions containing the above composition in varying concentrations. Other samples of the oil paint are modified with a 30 percent solution of 2,3,4,6-tetrachlorophenol in propylene glycol monomethyl ether or with a 30 percent solution of dipropylenetriamine-salicylaldehyde condensation product in propylene glycol monomethyl ether in varying concentrations. The modified oil paint samples are as follows:

| Paint sample | Concentration of 2,3,4,6-tetrachlorophenol in weight percent | Concentration of condensation product in weight percent |
|---|---|---|
| 1 | 0.75 | 0.075 |
| 2 | 1.0 | 0.1 |
| 3 | 1.5 | 0.15 |
| 4 | 1.0 | 0.0 |
| 5 | 3.0 | 0.0 |
| 6 | 0.0 | 1.0 |

The modified oil paint samples as well as unmodified paint are applied to panels of ponderosa pine and placed in a tropical chamber as described in Example 1. The panels are examined visually at the end of one week and at the end of four weeks. At the end of one week, panels painted with samples 1, 2, 3 and 5 show no mildew growth. Panels painted with samples 4, 6 and unmodified paint show mildew growth. At the end of four weeks, panels painted with samples 1, 2 and 3 show no mildew growth, panels painted with sample 5 show moderate mildew growth and panels painted with samples 4, 6 and unmodified paint show heavy mildew growth.

EXAMPLE 6

Compositions comprising varying ratios of (1) pentachlorophenol and (2) a condensation product of 1 mole of diethylenetriamine and 2 moles of salicylaldehyde are prepared by mixing the appropriate amount of pentachlorophenol and a condensation product of 2 moles of salicylaldehyde and 1 mole of diethylenetriamine in isopropyl alcohol as follows:

COMPOSITION 1—HALOPHENOL+CONDENSATION PRODUCT IN RATIO OF 1:1

| | Grams |
|---|---|
| Diethylenetriamine-salicylaldehyde (1:2) condensation product | 10 |
| Pentachlorophenol | 10 |
| Isopropyl alcohol | 80 |

COMPOSITION 2—HALOPHENOL+CONDENSATION PRODUCT IN RATIO OF 6:1

| | Grams |
|---|---|
| Diethylenetriamine—salicylaldehyde (1:2) condensation product | 2 |
| Pentachlorophenol | 12 |
| Isopropyl alcohol | 56 |

COMPOSITION 3—HALOPHENOL + CONDENSATION
PRODUCT IN RATIO OF 1:4

| | Grams |
|---|---|
| Diethylenetriamine—salicylaldehyde (1:2) condensation product | 20 |
| Pentachlorophenol | 5 |
| Isopropyl alcohol | 75 |

In separate operations, the above compositions as well as a composition of pentachlorophenol and a composition of the condensation product of 2 moles of salicylaldehyde and 1 mole of diethylenetriamine are incorporated in latex paint samples to produce modified latex paint compositions.

The latex paint employed for this operation is made by intimately blending a pigment dispersion having the following composition

| | Parts by weight |
|---|---|
| Titanium dioxide | 250 |
| Clay | 50 |
| Calcium carbonate | 50 |
| Diatomaceous earth | 25 |
| Potassium tripolyphosphate | 1.5 |
| Water | 270 | with a 48 percent solids content synthetic latex composition comprising a copolymer of 60 percent styrene and 40 percent butadiene.

100 gram samples of modified latex paint compositions are inoculated with 0.5 milliliter of a 24 hour culture of a mixture of organisms consisting largely of the Pseudomonas, Aerobacter and Proteus species previously isolated from spoiled samples of α-protein, latex or latex paint. The inoculated samples are incubated for 24 hours at 37° C. The incubated samples are then streaked on nutrient agar plates and the streaked plates incubated at 37° C. for 72 hours.

Examination of the plates at the end of this period shows that plates streaked with paint samples modified by the addition of the compositions comprising (1) halophenol and (2) condensation product show no microbial growth whereas plates streaked with paint samples modified with either halophenol or condensation product alone and streaked with unmodified paint show growth of microorganisms.

EXAMPLE 7

In an operation similar to that described in Example 6, a treating composition is prepared wherein the halophenol is employed in the form of a water-soluble salt. The ratio of halophenol salt to condensation product is 1:2. The treating composition is prepared by mixing the following components:

| | Weight percent |
|---|---|
| 3,3'-diaminodipropylamine—salicylaldehyde (1:2.5) condensation product | 14.4 |
| Sodium pentachlorophenoxide | 7.2 |
| Butanol | 78.4 |

The composition is incorporated into latex paint described in Example 6 to produce modified paint compositions in an amount sufficient to provide 0.1 percent by weight of sodium pentachlorophenoxide. Other latex paint samples are modified by the addition of butanol solutions of either sodium pentachlorophenoxide or polyamine-salicylaldehyde condensation product at levels of 0.2 percent and 0.1 percent, respectively. The modified latex paint compositions as well as unmodified latex paint compositions are inoculated, incubated, streaked on plates and the latter incubated as previously described and observed at the end of 72 hours. The plates streaked with paint compositions modified with the above treating composition show no microbial growth whereas plates streaked with paint compositions modified with sodium pentachlorophenoxide or polyamine-salicylaldehyde condensation product alone or with unmodified paint compositions show microbial growth.

EXAMPLE 8

A concentrate composition having the following components is prepared:

| Components— | Weight percent |
|---|---|
| Pentachlorophenol | 10 |
| Diethylenetriamine-salicylaldehyde (1:2.5) | 5 |
| Propylene glycol monomethyl ether | 85 |

The above composition as well as compositions comprising (A) pentachlorophenol in propylene glycol monomethyl ether and (B) diethylenetriamine-salicylaldehyde condensation product in propylene glycol monomethyl ether are prepared. The above compositions as well as the solvent, propylene glycol monomethyl ether, are employed to treat wood blocks of Southern yellow pine.

Wood blocks of about 0.4 cubic inch in volume are carefully weighed and impregnated with the treating solution. The impregnation is carried out by placing the blocks under about 5 millimeters pressure, adding the treating agent thereon, then releasing the vacuum and allowing the blocks to remain immersed at atmospheric pressure for 20–30 minutes. The impregnated blocks are blotted dry. The treated blocks are conditioned by maintaining at 70° F. and 50 percent relative humidity until a constant weight is obtained. The blocks are then placed in covered decay chambers holding soil containing an actively growing pure culture of *Lenzites trabea* and incubated at 80° F. for a period of 11 weeks. At the end of this period, the blocks are removed, any loose soil or mold growth brushed off and the blocks again conditioned and weighed. It is found that the wood blocks treated with a composition comprising pentachlorophenol and diethylenetriamine - salicylaldehyde condensation product show less than 5 percent loss in weight whereas blocks treated with pentachlorophenol alone, condensation product alone, or solvent alone show a loss of from about 40 to 60 percent in weight of the blocks.

EXAMPLE 9

A composition suitable for antimicrobial application is prepared by adding pentachlorophenol to ethylene glycol monomethyl ether solution of a condensation product obtained by treating 57 parts by weight of a mixture of aliphatic polyamines comprising about 75 percent diethylenetriamine and the remainder consisting predominantly of triethylenetetramine and tetraethylenepentaamine with 175 parts by weight of salicylaldehyde. The concentration of pentachlorophenol in the composition is 25 percent and the ratio of pentachlorophenol to the condensation product is 8:1.

This is a continuation-in-part of our prior application Serial No. 712,611, filed February 3, 1958, now abandoned.

We claim:

1. An antimicrobial composition comprising (1) a halophenol compound, said halophenol compound being selected from the group consisting of (*a*) halophenols having the structure

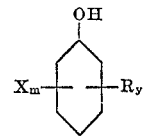

wherein R is a substituent selected from the group consisting of methyl and phenyl, each X is at least one of bromine and chlorine, y is selected from 0 and 1 and m is an integer of from 1 to (5—y), inclusive, and (*b*) water-soluble salts of said halophenols; and (2) a condensation product of from 1.5 to 3.5 molar proportions of salicylaldeyde with 1 molar proportion of an aliphatic polyamine possessing at least 3 amino groups and having the structure $$H_2N(C_nH_{2n}NH)_xH$$

wherein $n$ is an integer of from 2 to 3, inclusive, and $x$ is an integer of from 2 to 4, inclusive, and wherein said condensation product is present in an amount of from about 1/15 the weight of halophenol to about 4 times the amount of halophenol when based on weight.

2. An antimicrobial composition comprising (1) 2,3,4,6-tetrachlorophenol and (2) a condensation product of from 1.5 to 3.5 molar proportions of salicylaldehyde with 1 molar proportion of an aliphatic polyamine possessing at least 3 amino groups and having the structure $$H_2N(C_nH_{2n}NH)_xH$$

wherein $n$ is an integer of from 2 to 3, inclusive, and $x$ is an integer of from 2 to 4, inclusive, and wherein the ratio of said 2,3,4,6-tetrachlorophenol to condensation product is from about 15:1 to about 1:4.

References Cited in the file of this patent

UNITED STATES PATENTS

| | | |
|---|---|---|
| 2,568,579 | Coleman | Sept. 18, 1951 |
| 2,789,060 | Spangenberg et al. | Apr. 16, 1957 |
| 2,849,486 | Tousignant | Aug. 26, 1958 |
| 2,888,458 | Stromberg | May 26, 1959 |
| 2,914,560 | Robertson | Nov. 24, 1959 |
| 2,928,876 | Spivak et al. | Mar. 15, 1960 |